No. 735,986. PATENTED AUG. 11, 1903.
I. B. KILGORE.
VINEYARD OR ORCHARD CULTIVATOR.
APPLICATION FILED MAR. 25, 1903.
NO MODEL.
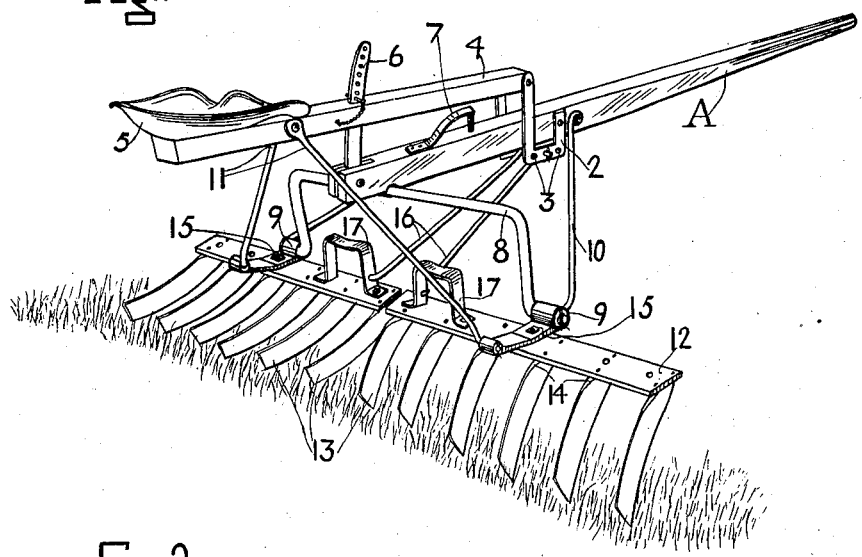
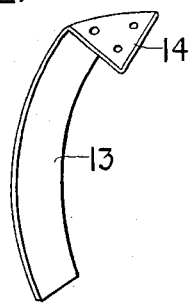
WITNESSES:
INVENTOR.
Ira B Kilgore
BY Geo. H. Strong,
ATTORNEY.

No. 735,983. Patented August 11, 1903.

UNITED STATES PATENT OFFICE.

IRA B. KILGORE, OF CONCORD, CALIFORNIA.

VINEYARD OR ORCHARD CULTIVATOR.

SPECIFICATION forming part of Letters Patent No. 735,986, dated August 11, 1903.

Application filed March 25, 1903. Serial No. 149,498. (No model.)

*To all whom it may concern:*

Be it known that I, IRA B. KILGORE, a citizen of the United States, residing at Concord, county of Contra Costa, State of California, have invented an Improvement in Vineyard and Orchard Cultivators; and I hereby declare the following to be a full, clear, and exact description of the same.

My invention relates to an apparatus which is especially designed for cultivating the soil where vines or trees are growing in rows; but it is also applicable to other forms of cultivation.

It consists of a series of curved cultivator-teeth fixed to independent swiveling frames, which are also turnable forward and back, and a main frame upon which these segmental frames are carried in such a manner that they may be reversed to stand upon either one side or the other.

It also comprises means for raising and lowering the supplemental frame, so as to vary the angle of the teeth in the direction of the line of travel.

My invention also comprises details of construction which will be more fully explained by reference to the accompanying drawings, in which—

Figure 1 is a perspective view of my invention. Fig. 2 is a perspective view of one tooth.

It is the object of my invention to provide a cultivator which can be driven between rows of growing vines, trees, or like objects, so as to thoroughly cultivate the soil between the rows, and to so construct the device that the angle of the cultivating-teeth to the line of travel may be changed, so as to throw the soil to or from the rows between which the apparatus is traveling, and also to so change the forward and backward tilt of the teeth that they may be more or less upright with relation to the line of travel.

As shown in the accompanying drawings, A is the pole to which the team may be attached, as I will hereinafter indicate.

2 represents rectangular U-shaped irons bolted to the pole, with the bottom part of the U extending parallel with and just below the pole, and this part is perforated with holes, as at 3, for a purpose to be hereinafter described.

One of the upright arms of the U need be no higher than the thickness of the pole. The other arms extend above the pole, as shown, and serve to receive the pivots of a beam 4, which extends rearwardly from this point and behind the rear end of the pole A. Upon the rear end of this beam 4 is fixed the seat 5.

6 is a segment fixed to the rear end of the pole and perforated or notched to receive a pin, by which the relative position of the rear end of the pole A and the seat-beam 4 may be regulated by means of a pin passing through the holes in the segment or by other well-known equivalent means.

7 is a clevis to which the team is attached to haul the machine, this being located well toward the rear of the pole, so as to bring the draft close to the cultivator portion.

8 is a bent or cranked axle the central portion of which is attached beneath the rear end of the beam and the crank portions bend downward on each side, and the ends are again bent outwardly parallel with the central portion, forming journals which are fitted into boxes 9, as shown. These boxes are firmly braced to the pole A in front of the part 2 by brace-rods 10, the front ends of which are bolted to the pole and the rear ends connected with the boxes, and these, in conjunction with the bent arm 8, form a triangular support for the boxes 9. From the extensions of the rear ends of these boxes other braces 11 extend upwardly and are bolted to the rear portion of the seat-bar 4.

12 represents beams adapted to carry the harrow or cultivator teeth 13. These teeth are made of steel preferably about three by five-eights inches, and the upper ends are bent at an angle, as shown at 14, so as to be bolted or riveted upon the under side of the flat steel beams 12. The lower ends of the cultivator-teeth are curved slightly to one side, and the toothed bars 12 are pivoted to the rear extensions of the journal-boxes 9 by vertical bolts, as shown at 15. This allows the tooth-bars 12 to be swiveled around these vertical bolts, so as to change the angle of the cultivator-teeth with reference to the line of travel. Thus by turning the beams in either direction the teeth will be made to throw the dirt more or less out of the line of travel of the machine and to or from the rows between which it is traveling. If it is desired to change the throw of the dirt, it is only necessary to remove the bolts 15, taking off the tooth-bars 12 and reversing them—that is, placing the one at the right upon the left and the one at the left upon the right—thus changing the throw of the dirt by reason of the curvature of the lower parts of the teeth.

In order to swivel the tooth-bars 12 about their vertical pivots 15 I have shown rods 16, the rear ends of which are attached to the inner adjacent ends of the tooth-bars 12, and the front ends are connected with the bottoms of the U-shaped bars 2 by pins passing through the holes 3, previously described. By adjusting these rods 16 forward or back in the holes 3 it will be seen that the angle of the bars 12 with relation to the line of travel will be changed. As shown in the present case, the connection of the rod 16 with the bars 12 is made by means of foot-rests 17, which are adapted to be bolted to the adjacent ends of the bars 12. Holes are made in the outer and the inner ends of these bars, so that when the bars are reversed, as previously described, the foot-rests can be changed so as to always be located at the inner ends of the bars 12. These foot-rests also serve in a manner to assist in steering the harrow to or from the row. Thus if it be found that the harrow is running too close to the row on one side the driver may bear his weight upon the foot-rest upon that side, thus sinking the teeth of that section more deeply into the ground and correspondingly forcing the harrow away from the rows. By reason of the curvature of the teeth from the top to bottom the line of draft and the center of the bars 12 will differ somewhat, and the pivot-bolts 15, by which the bars 12 are attached to the boxes 9, are placed as near the center of the line of draft as possible and not necessarily in the center of construction from end to end of the bars.

If it be found desirable to change the angle of the teeth 13, it is effected by reason of lowering the seat-beam 4 upon the segment 6 and by means of the brace-rods 11, which extend from the seat-beam to an extension behind the box 9, the raising of the seat-beam will tilt the bars 12 about the journals at the end of the crank-arm 8 and thus project the teeth backwardly and into a more nearly horizontal position, while by depressing the seat-bar 4 the teeth will be set up into a more vertical position.

Thus constructed the device has proved very superior in practice for the class of work for which it is designed.

Having thus described my invention, what I claim, and desire to secure by Letters Patent, is—

1. A cultivator comprising a pair of bars turnable upon vertical pivots and having curved teeth projecting downwardly; a pole; a yoke fixed to the pole and having its lower ends hingedly attached to the bars at one side of the pivots; a hinged seat-beam and rods secured to the rear portion of the beam and diverging downwardly and attached to the bars at the opposite side of said pivots.

2. A cultivator consisting of vertically and centrally pivoted tooth-bars having cultivator-teeth fixed to and extending downwardly and rearwardly therefrom, a draft-pole, a bent yoke attached and extending downwardly from the rear of the pole, journal-boxes in which the ends of the yoke are fitted, said boxes having rearward extensions to which the tooth-bars are pivoted, braces connecting the boxes with the pole, and rods adjustably connecting the inner ends of the tooth-bars with the pole whereby said bars may be turned to varying angles with the line of travel of the machine.

3. A cultivator consisting of independent tooth-carrying bars standing in line, a pole, a yoke secured to the rear of the pole, journal-boxes braced to the pole in which the ends of the yoke are turnable, said boxes having extensions to which the central portion of the tooth-bars are swiveled, a seat-bar having the front end pivoted to the pole, said bar extending rearwardly and capable of being raised or depressed about its pivot-point, and rods connecting the seat-bar with the rear extensions which carry the tooth-bars whereby the latter may be tilted and the angle of the cultivating-teeth changed.

4. A cultivator consisting of independent tooth-carrying bars standing in line, a draft-pole, a yoke fixed to the rear end bending downward having the outer ends formed in journal-boxes in which said journals are turnable, said boxes having extensions rearwardly, vertical pivots by which the central portions of the tooth-beams are turnably connected with the box extensions, a seat-bar having the front end pivoted above the pole and a seat fixed upon the rear end, connections between the seat-bar and the rear ends of the swivel-box extensions, and foot-rests fixed upon the inner ends of the tooth-bars whereby the rider may depress either of the tooth-bars and shift the cultivator to one side or the other.

5. A cultivator consisting of horizontally-pivoted tooth-bars standing transversely to the line of travel, curved teeth having their upper ends bent at an angle and fitted to the lower surface of the tooth-bars, swivel-boxes having rearward extensions to which the center of the tooth-bars are pivoted, braces connecting the boxes with the pole, braces adjustably connecting the inner ends of the tooth-bars with the pole whereby the tooth-bars may be turned to different angles with the line of travel of the apparatus, a pole, a seat-beam pivoted at the front end extending rearwardly above the pole, means for raising and lowering said beam, connections between the rear end of the beam and the rear extensions of the swivel-boxes, a yoke fixed transversely across the pole having the ends bent downwardly and fitting the swivel-boxes whereby the raising and lowering of the seat-bar will tilt the tooth-bars about the swivel-boxes and change the angle of the teeth.

6. The combination in a cultivator of a draft-pole having a draft attachment near the rear end, rectangular U-shaped brackets bolted to the sides of the pole with the lower ends parallel and having holes made therein, a seat-bar pivoted to the upward extensions of the brackets above the pole extending rearwardly and having a seat carried thereon, a segment fixed to the pole and means for raising and lowering the seat-bar about its pivot-point, a yoke extending transversely across the rear of the pole, bending downwardly and having journals formed on its outer ends, swivel-boxes in which said journals are turnable, braces connecting the boxes with the pole, extensions to the rear of said boxes and connections between said extensions and the seat-bar, tooth-carrying bars pivoted to the swivel-boxes and turnable about their pivots, foot-rests connected with the inner ends of the tooth-bars, and adjusting-rods connecting the foot-rests with the U-shaped brackets.

In witness whereof I have hereunto set my hand.

IRA B. KILGORE.

Witnesses:
P. M. SOTO,
M. T. SICKAL.